Feb. 3, 1925.

H. SWAY

AUTOMOBILE RADIATOR HOSE CONNECTION

Filed March 22, 1921

1,524,760

INVENTOR.
Henry Sway
By John W. Trehli
ATTORNEY.

Patented Feb. 3, 1925.

1,524,760

UNITED STATES PATENT OFFICE.

HENRY SWAY, OF CINCINNATI, OHIO.

AUTOMOBILE RADIATOR-HOSE CONNECTION.

Application filed March 22, 1921. Serial No. 454,502.

*To all whom it may concern:*

Be it known that I, HENRY SWAY, a citizen of Latvija, a part of the former Empire of Russia, now residing at the city of Cincinnati, in the county of Hamilton and State of Ohio, have invented certain new and useful Improvements in Automobile Radiator-Hose Connections, of which the following is a specification.

The object of my invention is to provide a simple, cheap, strong and highly efficient hose connection for automobile radiators, and provide a substantial, durable and unique way of connecting the same with the water tank; forming the same of a bracket like construction, making the attachment and supporting means and the hose connecting part all integral, and providing more ready and better conveying means for the water. By this construction, this part of the radiator can be made stronger, prolonging its life, allowing the water to flow and enter more quickly and forming a more steady and more rigid connection.

Figure 1:
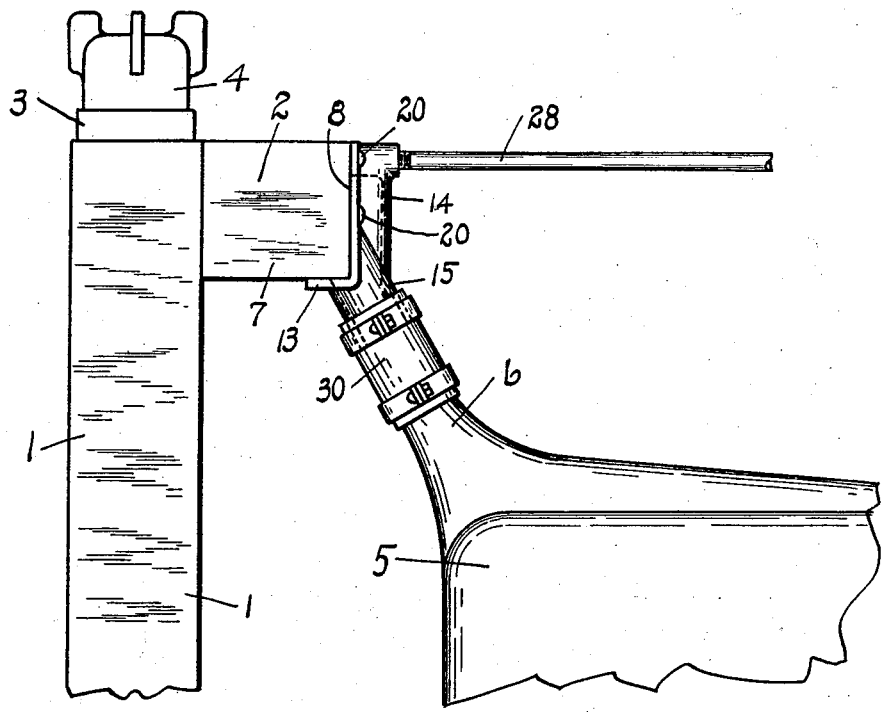
Figures 2, 3, 4:
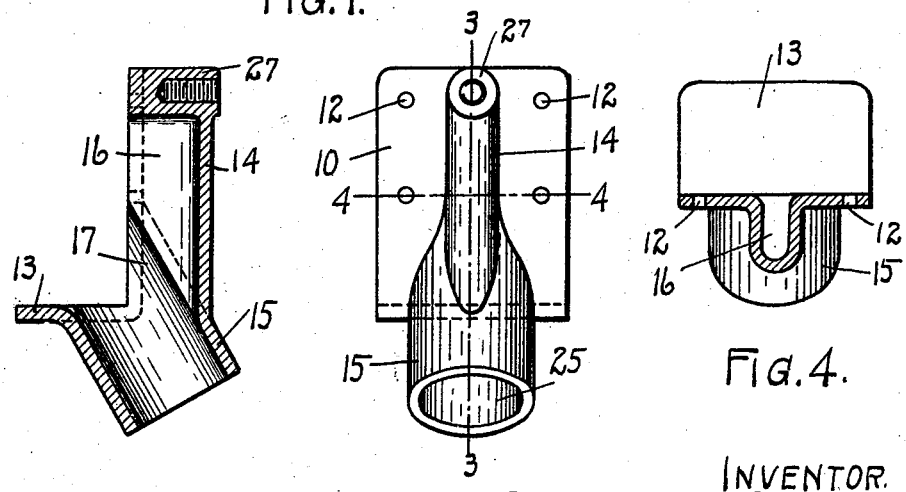

In the accompanying drawing forming part of this specification:

Fig. 1, is a view of my invention in elevation, attached to a part of the radiator and to the coupling member of the hose, the automobile parts being broken away, Fig. 2, is a view in elevation of my invention, Fig. 3, is a longitudinal section taken on the line 3—3 of Fig. 2, and Fig. 4, is a cross section taken on the line 4—4 of Fig. 2.

In the drawings, 1 represents the radiator and 2 the tank. The filling neck is marked 3 and the closing cap thereof 4, the engine covering or block is marked 5, which is shown broken away; it being well understood that the engine is contained within this covering and need not be shown. A conduit 6, leads to and is connected with the water jacket of the engine, not shown, but well understood in the art. The bottom of the tank 2 is marked 7 and its end wall is marked 8.

In carrying out my invention, I provide a bracket or support and hose connection all combined and made integral; employing a plate marked 10, provided with holes 12 and at its bottom having an apron or ledge 13, extending therefrom at approximately right angles; a rib 14, starting at the top of the plate 10 and running down to meet and unite with a downwardly extending mouth piece or coupling member 15; the rib being somewhat narrow and straight; and the coupling member extending downwardly and outwardly at an angle from the plate 10 and ledge 13. At the point where the coupling member 15 and the rib 14 meet, said coupling member becomes narrower, tapering until it unites with the wall of said rib. The rib is hollow on the inside as shown at 16 and becomes wider toward its lower extremity, widening out until it forms the mouth 17 of the coupling member 15; thus the mouth of the coupling member extends gradually upwardly at the point where the water enters, providing an easy entry and uninterrupted flow for the water.

It will be seen in Fig. 1, that the ledge 13 fits up against the bottom 7 of the tank 2 and at the plate 10 extends upwardly to the top of said tank and against the outside of wall 8, and is held in position by rivets or bolts 20, passing through the holes 12 in the plate 10, thus making a firm, rigid, supporting connection.

A coupling 30, extends between the mouth 25 of the coupling member 15 to the upper end of the conduit 6, the same as a hose connection, many forms of which are known in the art.

At the upper end of the rib 14, I provide a screw threaded recess 27, into which, one end of a stay rod 28 is screwed to strengthen the construction, the other end of the said rod being broken away.

The hollow part of the bracket is on the inside when the connection is put in place and the water enters out of tank 2 into the spaces 16 and 17 and then passes out through coupling member 15.

I do not wish to be confined to the precise shape and contour of the coupling herein shown, but may modify the same.

What I claim as new and my invention and desire to secure by Letters Patent is:

In an automobile radiator hose connection, in combination with the tank and connecting conduit leading to the engine, of a bracket coupling member, formed of integral parts, consisting of an upwardly extending plate, capable of attachment to the tank wall provided at its bottom with a downwardly extending ledge for engagement with the bottom of the tank, a rib on said upwardly extending plate and a downwardly and outwardly extending hollow coupling member, said rib also being hollowed out and merging with the hollow coupling member, said rib at its top edge provided with means for engagement with a stay rod.

In testimony whereof, I affix my signature at Cincinnati, Ohio, this 10th day of March, 1921.

HENRY SWAY.